March 23, 1943. S. R. PHELAN 2,314,597
METHODS FOR MAKING GEOPHYSICAL SURVEYS
Filed Dec. 14, 1939 3 Sheets-Sheet 1

INVENTOR
STEPHEN R. PHELAN
by J. H. Weatherford
Atty.

March 23, 1943.　　　S. R. PHELAN　　　2,314,597
METHODS FOR MAKING GEOPHYSICAL SURVEYS
Filed Dec. 14, 1939　　　3 Sheets-Sheet 2

INVENTOR
STEPHEN R. PHELAN
by J. H. Weatherford
Atty.

INVENTOR
STEPHEN R. PHELAN
by J. H. Weatherford
Atty.

Patented Mar. 23, 1943

2,314,597

UNITED STATES PATENT OFFICE 2,314,597

METHOD FOR MAKING GEOPHYSICAL SURVEYS

Stephen R. Phelan, Memphis, Tenn.

Application December 14, 1939, Serial No. 309,177

19 Claims. (Cl. 175—182)

This invention relates to geophysical prospecting. It relates to a method for exploring the condition of sub-surface strata or anomalies to determine the depth, nature, and extent thereof, and particularly to a method for determination of conditions at depth.

It relates to a method which employs an artificial electric field of flow in the sub-surface between two or more like sign electrodes adjacent each other as a group on the surface of the earth and one or more, or another adjacent group, of like sign electrodes of the other sign, and in this manner the resultant convergent or concentrated current intensity vectors that are influenced mainly by a group of like sign electrodes are made use of to establish greater and more nearly vertical current flow and to minimize the effect of conditions at or near the surface.

The methods heretofore used for studying sub-surface conditions in order to locate minerals, oil, and other things have comprised making circuit connections through conductors from the opposite poles of a source of current supply to spaced electrodes which establish contacts with the earth's surface and permit or cause the completion through the sub-surface structure between these electrodes of circuits for transmission of electrical energy sent out from such current source.

Around each of these introducing electrodes enclosing hemispherical surfaces of equal potential are set up, and lines of current flow are established that diverge from one electrode and after passing through the intervening earth converge to the other electrode.

Current flow is set up through the circuit established as above by the source of current energy that creates an observation field, and within such field observations and recordings are made at spotted points by instruments that determine quantities of the electrical or of the electromagnetic field, such as potential, resistance, impedance, phase, strength and direction of the magnetic field, etc. in or above the sub-surface structure, and the results obtained are plotted to scale to permit visual and measurable comparison.

The equipotential surfaces set up by current flow from the electrodes are variously distorted by the surface conditions near the electrodes and the lines of current flow are greatly distorted and diverted, and so also surface disturbances affect the equipotentials at intermediate points of the field, less so, but greatly compared to wanted anomalous bodies below. Therefore, surface lines of current flow between the electrodes are greatly distorted by other than the strata or bodies about which information is desired. Fields thus set up between electrodes not too far apart obviously indicate the horizontal position or the extent of such anomalous bodies, but they do not readily permit of determination of the depth of these bodies, or of strata, and as depth increases location horizontally becomes less definite.

My method, as to introduction of current, differs from the previous methods hitherto known in that the current is sent out through the conductors from one pole of the source of current supply to a number of electrodes, ordinarily two, though three or four or even more may be used. From the opposite pole of the current source a conductor is led usually to a single electrode, though even here two or more might be used, and the circuit is completed as before through the earth between the like sign electrodes or electrodes like-connected to one pole and the one or more electrodes connected to the other pole.

As to pick-up, my spotted points on the surface are never located in the previous manner at equipotential circle traces surrounding any one electrode alone, but at equipotential surface traces surrounding two or more, or a group, of like-connected electrodes. Thus, not just the current lines from one like-connected electrode, but from all like-connected electrodes of the group are observed in depth. Especially do I make use of pick-up of the first or flattened equipotential surfaces that "blanket" strata below for distinguishing oil and water strata. Outside these flattened traces on the surface, the traces grade into circles again, and the hemispherical equipotential surfaces thus represented are employed by me for electrical indication of the succession of the strata in general, and for depth determinations.

The electrodes previously used, in and of themselves have, according to conditions, or the preference of the user, been single electrodes or a closely connected group that acts as a single electrode for the transfer of the current flow to the earth, these being either "point" electrodes or other types likewise well known, and in the present case no departure is contemplated or intended, the term "electrode" above and hereinafter used being intended to designate any of the well known types, either single or group.

Usually my method involves the establishment at a predetermined distance apart of two electrodes connected to one pole of a current source and the establishment of an electrode connected to the other pole at a predetermined distance from the more near of the like-connected electrodes. Preferably my method establishes the three electrodes substantially in alinement, though departure of the other-connected electrode from the extended line of the two like-connected electrodes is permissible and has no great effect on the determinations of the electrical or electromagnetic anomalies desired. Points of pick-up for electrodes of pick-up or search coils in conjunction with instruments of pick-up for measurement are spotted in most cases substantially along the line of the two like-connected electrodes. Also more involved determinations may be made at right angles and even at other angles to the straight line connecting the two electrodes.

It is found from indications determined in use that with comparatively close separation of nearest like and other-connected or like sign and other sign electrodes, for example, with said separation about equal to that between adjacent like sign electrodes, the flattened and outside hemispherical equipotential surfaces extend under and beyond the like sign electrode most distant in that direction away from the other sign electrode in such manner as to give indication of the rocks and minerals thereabouts by the usual pick-up between like and other sign electrodes. It is therefore possible, by pick-up as before in accessible regions, to survey in depth under lakes, marshes, and other inaccessible surface regions. This extension field effect likewise occurs in the case of more than two like sign electrodes as an adjacent group.

The objects of my invention, therefore, are:

Primarily to provide a method for making use of known instruments for the determination of data relating to the extent and depth of anomalous bodies and the depth of strata, including oil strata, both below accessible surface electrical current field areas or beneath like-connected electrodes adjacent each other, and, when necessary, below inaccessible surface field areas beyond the last of the like-connected electrodes remote from the other-connected electrode or electrodes, both methods surveying to depths hitherto impossible; and To provide a novel method for relatively arranging in novel manner known instrumentalities and therefrom determining data relating to the extent and depth of sub-surface anomalous bodies or strata, both below accessible surface electrical current field areas or beneath adjacent like sign electrodes and, when necessary, below inaccessible surface field areas continuing from the last like sign electrode in direction away from the other sign electrode.

In carrying out or accomplishing the objects of the invention in its preferred form, three electrodes are established, as along a substantially straight road at measured intervals. Two relatively adjacent electrodes are connected separately or by the same conductor to one pole of a source of current and are therefore of like sign, and the other of said electrodes is connected by a conductor to the opposite pole of the current source and is of other sign. The distance between the like sign electrodes, which determines the depths of measurement or survey and is greater for greater depths, is used as a basic distance in arrangement, and the other sign electrode is positioned preferably along the extended line of the two like sign electrodes at a distance from the relatively adjacent one of the like sign electrodes that bears a predetermined ratio to such unit distance. Pick-up points or locations of electrodes or search coils, picking up the indication effects for instruments, are available in two alternative preferable paths, first, between the like, and the other sign, electrodes, second, along the extension of such line from the end like-sign electrode in the opposite direction. These pick-up points beginning at a predetermined distance from the two respective like sign electrodes, proceed from the first equipotential trace enclosing both like sign electrodes. Absolute, as meters; or comparison, as potentiometers; or ratio instruments of pick-up may be employed.

In the drawings, which are schematic for both A. C. and D. C. current sources—

Fig. 1 is a plan view of the surface of the ground showing two electrodes connected to one pole of a source of current, and an electrode at "infinity" connected to the opposite pole of said source, to establish current flow. The view illustrates the current flow intensity lines and the horizontal traces of equipotential surfaces adjacent the two like sign electrodes, showing influence of such electrodes on current intensities and surfaces, together with the preferred general line and location of spotted pick-up points.

Fig. 2 is a corresponding elevation view showing vertical traces of the equipotential surfaces and the lines of current flow near the like-connected electrodes, on a plane passing vertically through the like-connected electrodes.

Fig. 3 is a plan view showing three electrodes connected to one pole of a source of current and an additional electrode spaced therefrom and connected to the other pole to establish current flow, the view also showing the horizontal traces of equipotential surfaces around the like connected electrodes and the manner in which the three electrodes influence the pattern of these surfaces. A few current lines are sketched to show they thin out relatively in pick-up areas preferred much as in Fig. 1.

Figure 9:
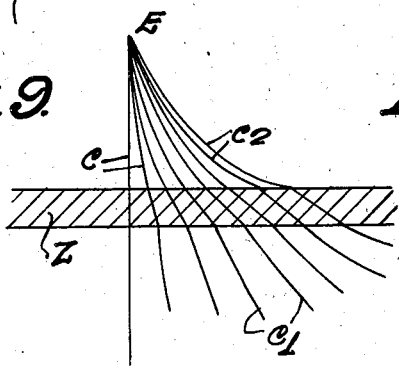
Figure 10:
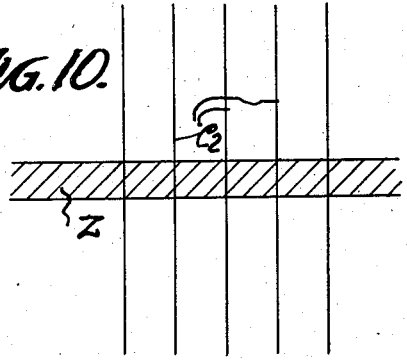

Fig. 9 shows the diverging flow lines of customary use in other methods previous to this one refracted by a stratum of ten or more times less conductivity than its surroundings to "saturation," or "full packing" of current lines; and Fig. 10 represents lack of "saturation" with the non-conductivity ratio of "saturation" above, the uniform flow of current here being parallel and vertical to the stratum as if it has been produced by like-connected electrodes in arrangements herein described.

Figure 1:
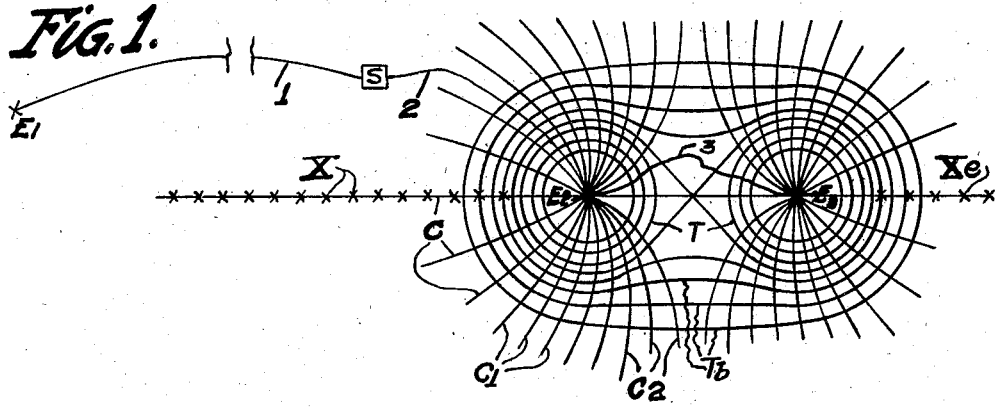
Figure 2:
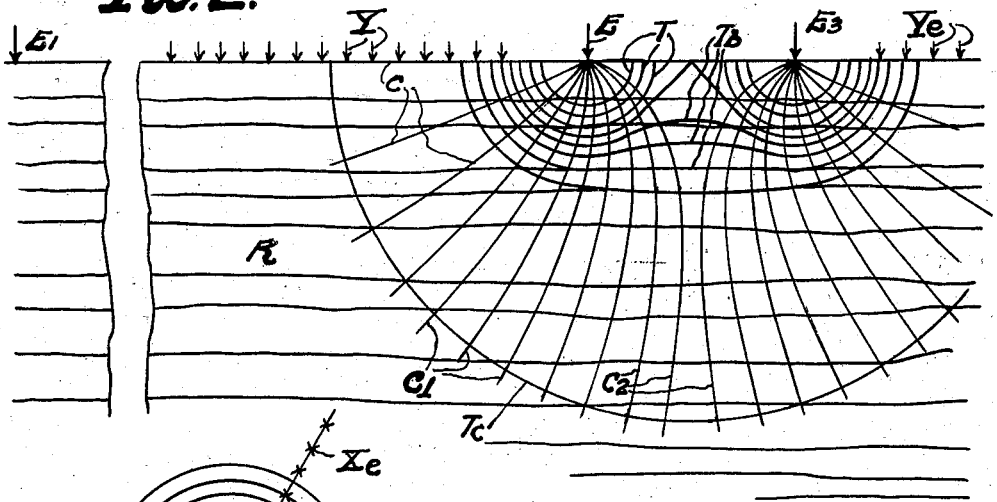

Referring now to the drawings, in Figs. 1 and 2, E1, E2 and E3 are electrodes establishing points of introduction of current into the earth, the electrodes E2 and E3 being spaced at a measured distance selected for a desired depth determination, and the electrode E1 being relatively spaced at more than twice such measured distance, this greater spacing for the present method corresponding to the "infinity" distance of previous methods, though definitely much less than would be necessary in heretofore known methods.

S represents a source of current, which may be A. C. or D. C., or any special type of either. With A. C. at a thousand feet or so frequencies of the order of 500 cycles not smooth in wave form are easily used, but at some thousands of feet of depth a smooth wave form, as a sine wave, and reduction of frequency, are advantageous. One pole of the current source S is connected in the usual manner by a conductor 1 to the electrode E1, this conductor preferably being an insulated wire, and if so, it may be as usual laid along the surface of the earth. In any event with A. C., it is laid along lines diverging sufficiently from the desired line of pick-up to remove or diminish any induced current in the pick-up leads to the pick-up instrument. The opposite pole is similarly connected by a conductor 2 to the electrode E2 and this electrode is connected by a continuing conductor 3 to the electrode E3, though both may be connected to the source pole by individual direct leads.

Figure 6:
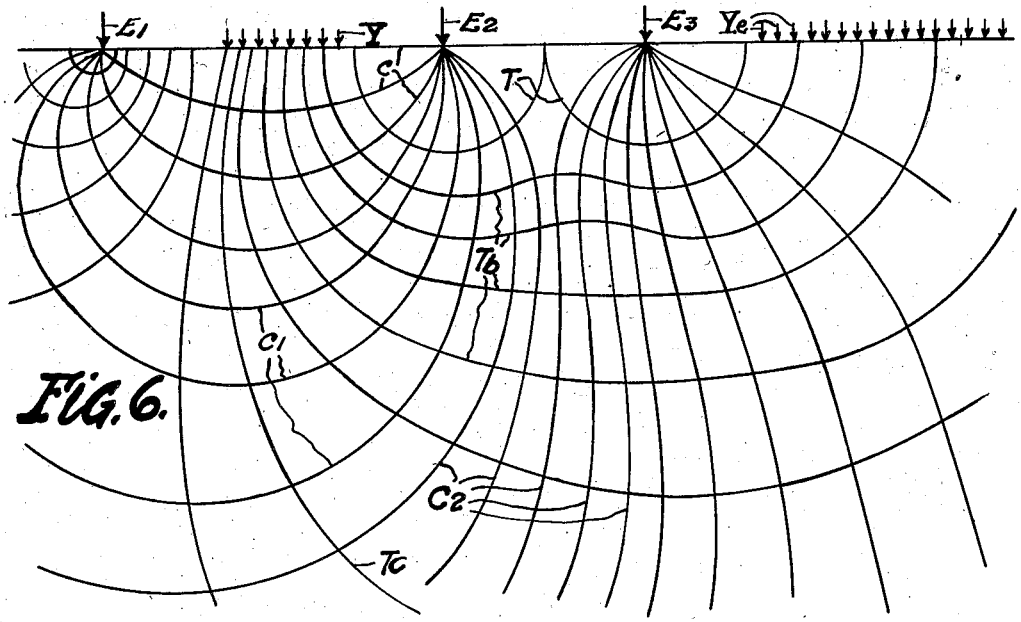
Fig. 6 is an elevation showing two like-connected electrodes and one other-connected electrode, the other-connected electrode being at one and one-half times the distance from the nearer of the like-connected electrodes that such like-connected electrode is spaced from the other thereof.

No attempt is made to illustrate the actual current paths but the general course and densities, that is, the vector intensities of current flow, not unlike those for a single homogeneous medium, are indicated in Figs. 1, 2, 3, 4, 6, 9 and 10 by diverging lines C, C1, and C2. In Figs. 1, 2 and 6 these current lines are shown diverging from the like sign electrodes E2 and E3 through rock or mineral strata R according to a pattern established mainly by said electrodes. At right angles to the current lines are drawn circular equipotential traces, T, around respective like sign electrodes. Radially outward occur, and are shown, the relatively flat or "blanket" equipotential surface traces Tb for covering a desired stratum more completely. Likewise, traces Tc further out grade into circles again. Both the "blanket" and the circular traces outside surround all two like sign electrodes at once.

The general locations of pick-up points and direction of the preferred pick-up line, dictated largely by the attenuation of the current intensity lines, are indicated by the successions of cross marks X, Xe in the plan view, Fig. 1, and by the succession of vertical arrows Y, Ye in the elevation view, Fig. 2. These locations, or spotted points, of pick-up using pick-up electrodes, search coils, or other means of pick-up, none of which are shown, are not always at an equal distance from one another, as drawn, but most frequently are so arranged for convenience in plotting results after field work. There are, in the general direction spotted, two equivalent alternative series of pick-up points, or pick-ups of the same equipotential traces, one series lying between the like-connected electrode and the other-connected electrode, and the other series, near the extension of the line of the like-connected electrodes diametrically opposite. Pick-up begins, as shown, at or near the first equipotential traces Tb enclosing both like sign electrodes at once, and extends outwards from the like sign electrodes a predetermined distance depending on ultimate depth desired. By using another path of pick-up electrodes at an angle to the general one through points of less concentration of current on the surface, and more involved procedures a survey can also be made in case of need. But pick-up in current areas attenuated relatively to other areas allows me to achieve, besides penetration of current to depth and increase or concentration of current in depth, "effective penetration" of the anomaly effect through the interfering surface and near-surface unwanted anomalies.

Figure 3:
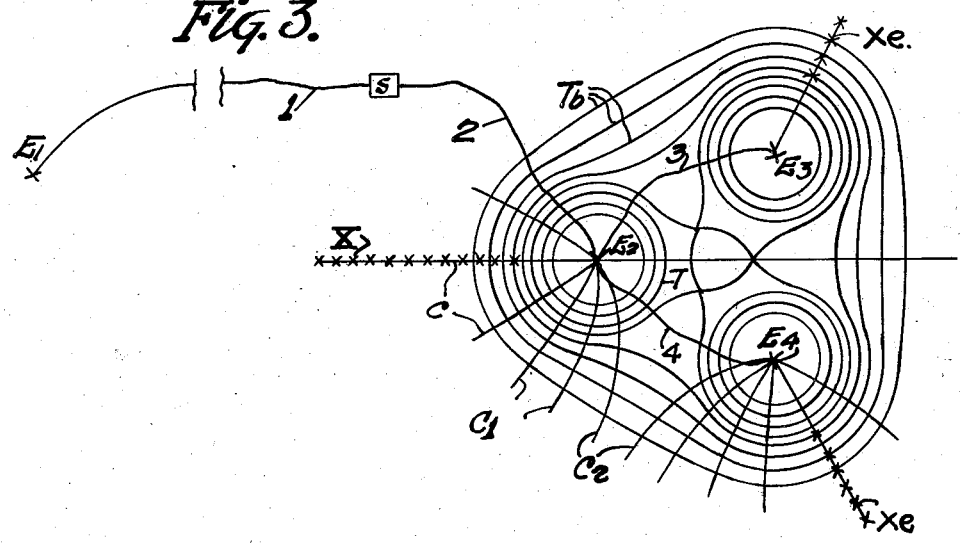

Fig. 3 is a plan view of the set-up for three adjacent electrodes E2, E3, E4, connected together by conductors 3 and 4 from E2 to the others; thence connected from E2 to one pole of the source S by the conductor 2. Likewise, an alternative arrangement is to connect each of said electrodes directly to the same pole of S. The electrode E1 connected by conductor 1 to the other pole of the source S is shown at the "infinity" alternative use. The distribution of equipotential traces T, Tb is shown. Further, a few current lines C, C1, C2 are sketched across them at right angles to show similarity of current distribution to previous drawings. The cross marks X, Xe indicate pick-up spots determined by the spreading about or thinning of the current intensity lines C. Preferred pick-here, too, begins at the equipotential surfaces Tb first enclosing all three like sign electrodes, and proceeds radially out from the group to the equipotential traces of given-depth equipotential surfaces.

Figure 4:
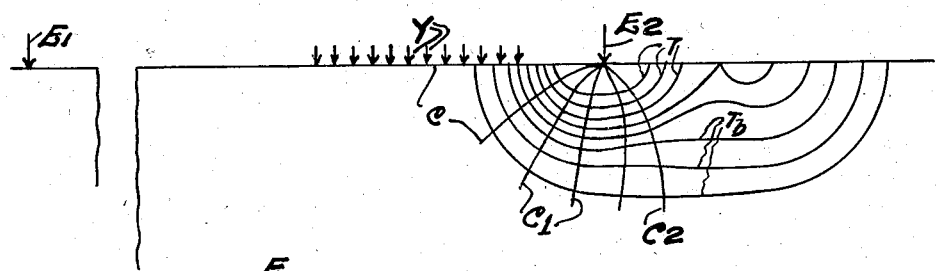
Fig. 4 is an elevation showing the vertical traces of these equipotential surfaces along a vertical plane containing one of the electrodes and equidistant between the other two thereof, together with a few lines of current flow near or in this plane to illustrate the concentration in depth as before.

Fig. 4 is an elevation view of this three-electrode group of like sign electrodes. Equipotential traces T, Tb and a few current lines C, C1, C2, converging or concentrating in depth are shown. Any reasonable number of like sign electrodes, in any particular form of grouping, can be substituted for the three like sign electrodes E2, E3, E4. Spacings between adjacent like sign electrodes of a group, while preferably equal, do not, however, necessarily have to be any more nearly equal than symmetry and flattening of the pick-up equipotential surfaces demand. The other sign electrode E1 can be moved to a distance comparable to the separations between like sign electrodes without serious distortion of the original pattern. A survey of this type at either finite or "infinite" separation of the group of many like sign electrodes from the other sign electrode or electrodes is used for greater concentration of current in depth, hence more detailed, though less rapid surveying.

Figure 5:
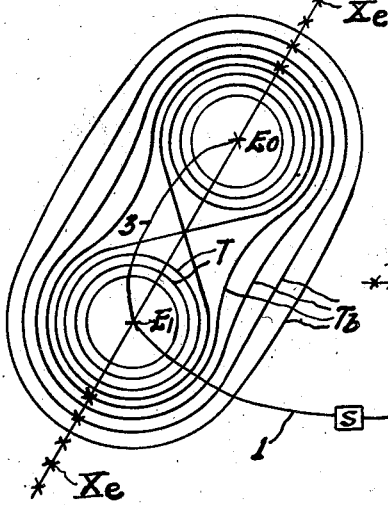
Fig. 5 is a plan view similar to Fig. 1, and is introduced for the purpose of showing that one or more adjacent electrodes may be connected to one pole and two or more adjacent electrodes to the other pole at the same set-up.
Figure 5:
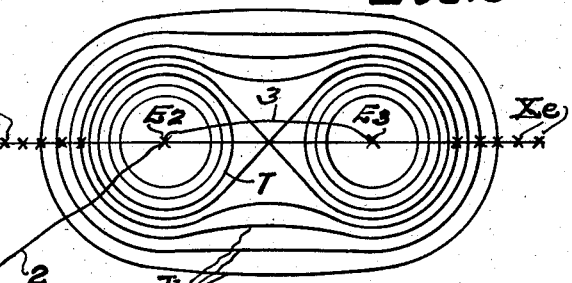

Fig. 5. a plan view, shows by the corresponding systems of equipotentials T, and Tb around like electrode groups E0, E1; and E2, E3; respectively, at right angles to which flow current lines (not here shown) as in the distribution influenced mainly by E2, E3 in Figs. 1 and 2, and that when two or a plurality of electrodes are connected to each of the opposite poles of the source S at the same set-up, each like electrode group tends to maintain its identity of current pattern. With two adjacent electrodes connected to each pole, as shown, each group of two adjacent like-connected electrodes tends to keep the same current pattern at both finite separation here shown and "infinite" separation. Electrodes E0, E1; and E2, E3, are shown equal, but are not necessarily equal. Further E0, E1 and E2, E3 may be, but as shown are not necessarily along a straight line. Connections from each pole are made to each of the two like sign groups as though to the one like sign group of Fig. 1. Preferred pick-up is marked for each group here and is the same as for the one group of Fig. 1. It will be understood that each or either, group might have comprised three or even more electrodes. Distances between the separate like sign electrodes in one group, preferably but not necessarily, are made equal to those of the other group. An effective method for surveying in all directions, the radial plan of running out lines, employs a plurality of like sign groups at the same set-up. Like sign electrodes are arranged symmetrically outward in groups of two or more from a common central point as along the spokes of a wheel. Expanding from the central point at a fixed ratio for different set-ups outwards in increasing the depths reached, or successive set-ups outwards at a fixed separation of electrodes for constant depth, can be practiced. Usually, however, the survey is along a road and something of a single line of electrodes is established at a set-up and run along the road with the same separation of introduction electrodes or expanded with fixed ratio of all electrodes.

Fig. 6, an elevation view, with the electrode E1 at the finite distance from E2 of one and one-half times the separation between like sign electrodes E2 and E3, is similar to Fig. 2, except that the latter view is for a greater or "infinity" separation. The separations are said to be in the ratio one and one-half to one. This finite method, as can be seen from the complete diagram of flow presented in Fig. 6, is about the same as the "infinity" use, Fig. 2, therefore, from economy in laying conductor, it is more often used. Infinite set-ups for this and other similar methods described herein are employed in order to minimize distortion of the equipotential surfaces or traces Tb, Tc, hence giving better determinations of depth. Where depth is not the primary question, detection is not impaired and depth is given approximately by the finite set-ups of electrodes, and this set-up suffices for most work. Of the two separate series of pick-up points Y, Ye, shown as vertical arrows extending along opposite directions out from each of the two like sign electrodes, that one Y between the like and other sign electrodes, due to more limited distance of pick-up for the same equipotential surfaces, is preferred. In this figure at certain depths the equipotential surfaces Tb and Tc extend under and beyond E3.

Figure 7:
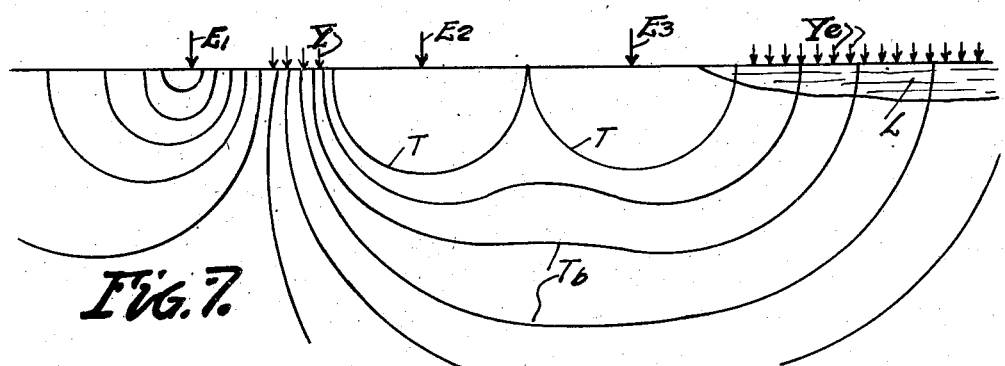
Fig. 7 shows the three electrodes at equal spacing.

Fig. 7 shows a ratio of one to one, frequently employed. For special use in obtaining readings of regions beneath inaccessible country the extension of the equipotential surfaces Tb, Tc under and beyond the electrode E3 has proven valuable both for "blanket" or flattened equipotential pick-up or otherwise. Thus, this ratio can be used in the regular course of surveying or for the novel extension method of surveying. It differs in degree of extension and in requirement of less conductor from Fig. 6. The pick-up equipotential surfaces Tb and Tc have a more prolonged extension beyond the electrode E3 and underneath the lake L shown. The equipotential lines are shown as they are typically created for accessible territory and readings may be taken at Y or Ye. The lake L, however, has been superposed on this showing and this lake would obviously affect to some extent the equipotential lines, though the effect is not shown. The lake renders the section beneath the points Ye substantially inaccessible, but it is possible and preferable to take the readings at Y at which points the lake has substantially little effect rather than with much greater difficulty at Ye where such effects might vitiate results. Surveys of lakes, marshes, rivers, shoreline bodies of water and other difficult and impossible regions can be easily made for the first time by this novel method of extension.

Figure 8:
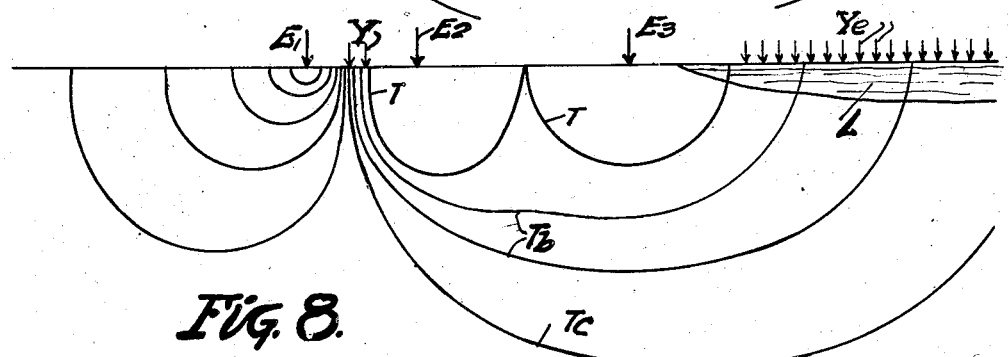
Fig. 8 shows the other sign electrode at one-half the spacing of the two like sign electrodes. These last two figures also show the increased extension of the equipotential surfaces of pick-up under a lake, or inaccessible area on the surface.

Fig. 8 shows a one-half to one ratio. The principal use of this method is in extension surveys. For ratios of under one-half to one current tends to concentrate the current intensity lines C, C1 and C2, at the surface of the ground between the electrodes E1 and E2, as in the older methods, and from surficial unwanted anomalization their practice is subject to errors.

All set-ups of like sign electrodes should be adjusted to secure approximately equal flow of current through each electrode. This may be done by taking ammeter readings and driving the electrodes down to unequal depths if necessary until substantially balanced flow is obtained. The closer equal currents are approximated, the more predetermined patterns are carried out in equipotentials and the closer depths can be estimated. Experiments and surveys show this adjustment of currents need not be critical at all, but the better patterns are given by making currents equal.

As an example of a survey by one of these methods, the procedure in the field for the "one to one" ratio survey illustrated in Fig. 7 is given. Three metal electrodes of introduction E1, E2, E3 are placed along somewhat of a straight line, preferably along a road. I employ, as a rule, electrodes one inch in diameter driven several feet into the ground. The distance of separation of electrodes increases with increasing depth zones to be read. Given a like-sign electrode separation of 2000 feet, at 1000 to 3000 feet approximate depth there would be a zone of "blanket", or comparatively flat equipotential surfaces Tb, and deeper the surfaces would grade into hemispheres Tc. For 4000 feet separation, the "blanket" zone would be from 2000 feet to 6000 feet down, plus the deeper hemispherical equipotential surfaces Tc.

By placing a surveying rod on the extension in either direction of the line of like sign electrodes E2, E3, and "sighting in" given points along either extension, said points are measured off with a surveying chain and spotted or marked. Because of less distance of pick-up or more crowded equipotential surface traces, I prefer to spot the pick-up points Y towards the other sign electrode E1. In either series of spotted points Y or Ye available, the spotting is begun at about half the separation of the like sign electrode E2 from the electrode E3. The spotting interval or separation of pick-up points varies from a meter or so to much greater distances and is preferably made equal for ease of plotting the indications from the pick-up instrument or equipment.

The source of current S, for which purpose I often use a D. C. or low frequency A. C. generator driven by a gasoline motor to give about 100 volts and an ampere or so, is placed between the like and other-connected electrodes. Insulated conductors 1 and 2 from respective poles of the source S are connected to the electrodes E1 and E2, and the latter to the electrode E3. For A. C. the conductors 1 and 2 are laid with an offset of a hundred feet or more from the line of spotted points X so that appreciable currents induced in the pick-up leads are rendered negligible. Currents through the separate like sign electrodes are checked by ammeter readings and are equalized.

The pick-up instrument or apparatus is now operated along the line of spotted points and readings recorded for calculating or plotting. Such single set-ups as described can be run along given directions or in grid or crossing patterns, and the speed of running them depends on whether more or less detailed readings are desired. It is well to keep away from wire fences and other short-circuiting conductors of a prolonged nature.

Curves plotted from field surveys have demonstrated that this method is able to distinguish layered anomalies, such as oil strata or water sands, from the surrounding rocks at depths of thousands of feet. For this purpose I make use of the flattened "blanket" equipotential surfaces Tb surrounding the adjacent electrodes in the like sign group. For clear understanding of this more direct distinguishing or detecting or logging of strata than heretofore explanations are given.

Fig. 9 shows the usual current intensity lines C, C1, C2, diverging from a single electrode, E, and refracted by an anomalous stratum, Z. The anomalous stratum shown is more than ten to one in ratio, or of more than ten times less conductivity than its surroundings. Therefore, the current lines will assemble to "saturation" from comparative inability to penetrate the stratum, or will be refracted to the full extent at about this ten to one ratio. This "saturation" or limiting effect in anomalization by an anomaly is shown by the very "close packing" of the current lines around the border of the stratum. The same is true for a one to ten ratio, that is, the more conductive anomalous stratum "saturates" or refracts the current lines to a comparative end of effect. This "packing" to "saturation" proceeds quickly, and more so at first, from one to one ratio up to the ten limit.

Fig. 10, on the contrary, represents a vertical uniform parallel flow of current intensity lines C2 proceeding without refraction through a ten to one, or one to ten condition of anomalous stratum Z, versus surroundings. Such a flow is approximately established by the methods described herein, these lines being best shown in Fig. 6, and as will there be seen, most definitely effective in those regions of flat or "blanket" equipotential surfaces Tb. Simple flow of this type obeys Ohm's law or its A. C. equivalent for each of the stratified media of flow separately. Because of this fact the approximate vertical uniform parallel flow established in the anomalous stratum tends to flow according to the same laws. As a result the anomalization of the stratum has a proportional effect. Even if the strata are at something less than a right angle to current flow, or the anomalous stratum has a different angle to current flow than others, more or less uniform parallel flow, not so able to penetrate as vertical flow at right angles, but still having something of proportional effect in anomalization, occurs. Where before a ten to one or one to ten ratio caused "saturation" or maximum comparative effect between strata, now such ratio tends to create ten times as much effect as a one to one ratio, and with an increasing ratio an increasing effect of anomalization is present. Both field curves and carefully collected data confirm such statements.

Oil sands, which with the diverging current flow used before created no more anomaly effect than dense shales or other rocks of ten times less conductivity than surroundings, due to the relatively small proportional anomalization of such confusing strata compared to the proportional anomalization of oil strata, now, with comparative uniform parallel flow, can be differentiated better from said confusing rock strata. The same is true of salt water sands versus medium-conductivity strata giving much the same effect formerly, but now giving a lower effect. In other words both high and low-conductivity strata can be distinguished from medium-conductivity strata now. Moreover, with D. C. current especially, but to a limit of non-conductivity for A. C., the high and low-conductivity strata can be differentiated better among themselves, as respective high-conductivity from less high-conductivity strata and respective low-conductivity from less low-conductivity strata. No attempt is made, however, to differentiate strata equivalent electrically with oil strata or of the same conductivity from oil strata. Examples of such strata are rock salt, gypsum, anhydrite, dry or dense rock, etc.

On the other hand, should I desire to trace the succession of strata out electrically or log the sedimentary column irrespective of frequent confusion of oil strata and water strata with medium-conductivity strata, I pick up current lines that diverge, as in older methods, but in a different manner. Instead of picking up spherical equipotential surfaces surrounding separate electrodes I pick up hemispherical equipotential surfaces that surround a group of adjacent like sign electrodes concentrating more current in depth than a single electrode. These are outside of the flat or "blanket" equipotential surfaces. It is another characteristic of current systems diverging across an anomalous stratum, besides "saturation" at the ratios of ten to one and one to ten, to give more anomaly effect for small differences in ratio of anomalous stratum and surroundings, say 1.25 to 1, or 1 to 1.25, per amount of difference of ratio from surroundings than for larger difference ratios, say five to one or one to five. Hence small differences in ratio are more readily brought out, as formerly, but with greater current concentration, and from place to place the sedimentary column gained electrically can be correlated for structure.

Penetration of current to depth is much more in the case of two or more electrodes of like sign than in the case of a single electrode alone sending out the current. Curves of field results, over known drill holes, experiments, and other data show this is true. Mutual repulsion of current lines from like sign electrodes drives them more in the direction of depth, and more vertical flow at right angles to strata allows them to pierce the strata with less refraction and go to depth. "Effective penetration," or emergence of the anomaly effect through to the surface with less unwanted surface interference, is aided by increased volume of anomalous stratum in relation to surrounding rock included in pick-up of the "blanket" equipotential surfaces. The principal aids, however, to "effective penetration" are the relatively attenuated surface and near-surface regions of current flow. Disturbances originating at or near the surface caused by uneven distribution of overburden or moisture in it, boulders, clay lenses, irregular topography, etc., as mentioned before, do not create such interfering anomalies in these relatively decreased portions of current flow along pick-up.

Similar, therefore, to the diverging current pattern of previous finite methods, the pick-up regions of less current intensity lines cause less anomalization. "Shielding" or "masking" of an anomalous stratum underneath by one above is likewise reduced greatly by reason of vertical piercing of strata without refraction and of comparatively less current flow at or near the surface or above the anomalous stratum.

Investigations over known drill holes for the purpose of checking the surface pick-up curves of electrical readings with the succession of strata and depth of such strata have confirmed the reliability of this method in practice. Pick-up curves for about 100 cycle frequency have been proven over a drill hole 3000 feet deep. Although 500 cycles could have been used, as shown by other surveys and calculations, at this depth it is advantageous to increase penetration of current in amount by reducing the frequency. A smooth wave form, as a sine wave, preferably free of harmonics, is an improvement at greater depths of this order and more. The ability of D. C. to penetrate much better than A. C. is well known and has been demonstrated in my investigations. My field surveys over known and unknown formations, however, have utilized in most instances A. C. of about 500 cycles for ease of pick-up indications. Those field surveys over drill holes in known strata to gain indication of known oil-bearing strata and the known approximate depth of such strata have been particularly effective in demonstrating the usefulness of these methods in depth. From these surveys and the others made for the succession of the strata in depth alone has come proof in actual practice and many facts in support of the matter herein. For the greater depths reached in surveying the cost also is much less, especially for finite methods, because of less conductor laid, than for previous methods of electrical prospecting.

I claim:

1. A method of geophysically exploring subsurface earth structures, which includes establishing three widely spaced electrodes and a source of current; connecting a pair of said electrodes, to one pole of said source, and one said electrode, spaced from said pair, to the other pole of said source to cause current flow and set up a jointly induced group of equipotential surfaces around and spaced from said pair of electrodes, thereby creating along the surface of the earth a survey field spaced as a belt from and around said pair of electrodes, said field embracing the traces of said jointly induced equipotential surfaces; and making pick-up observations at spotted points in said field, to obtain desired data.

2. A method of geophysically exploring subsurface earth structures, which includes establishing a plurality of widely spaced electrodes and a source of current; connecting a pair of said electrodes to one pole of said source, and a second pair of said electrodes, spaced from the first said pair, to the other pole of said source to cause current flow and set up groups of equipotential surfaces, respectively each around a said pair of electrodes, thereby creating along the surface of the earth survey fields, each spaced from and around its respective pair of electrodes, and embracing the traces of said equipotential surfaces around each of said pairs respectively; and making pick-up observations at spotted points in said field, to obtain desired data.

3. A method of geophysically exploring subsurface earth structures, which includes establishing a plurality of widely spaced electrodes and a source of current; connecting a group of three said electrodes, to one pole of said source, and one said electrode, spaced from said group, to the other pole of said source to cause current flow and set up equipotential surfaces around said group of electrodes, thereby creating along the surface of the earth a survey field spaced from and around said group of electrodes, said field embracing the traces of said equipotential surfaces; and making pick-up observations at spotted points in said field, to obtain desired data.

4. A method of geophysically exploring subsurface earth structures, which includes establishing a plurality of widely spaced electrodes and a source of current; connecting a pair of said electrodes to one pole of said source, and a second pair of said electrodes spaced from the first said pair to the other pole of said source to cause current flow and set up groups of equipotential surfaces respectively each around a said pair of electrodes thereby creating along the surface of the earth survey fields each respectively spaced from and around said pair of electrodes, and embracing the traces of said equipotential surfaces around said pairs respectively; and making pick-up observations at spotted points in said field to obtain desired data; said spotted points being located substantially along lines each respectively passing through the two electrodes of a said pair.

5. A method of geophysically exploring subsurface earth structures, which includes establishing a plurality of widely spaced electrodes and a source of current; connecting a group of three said electrodes to one pole of said source, and one said electrode, lying without said group, to the other pole of said source to cause current flow and set up equipotential surfaces around said group of electrodes, thereby creating along the surface of the earth a survey field spaced from and around said group, said field embracing the traces of said equipotential surfaces; and making pick-up observations at spotted points in said field to obtain desired data; said spotted points being located substantially along the median lines of the regions of relatively attenuated current density.

6. A method of geophysically exploring subsurface earth structures, which includes establishing a plurality of widely spaced electrodes and a source of current; connecting a group of two said electrodes to one pole of said source, and one said electrode lying without said group to the other pole of said source to cause current flow and set up sets of equipotential surfaces respectively each around a said electrode, and a jointly induced set of surfaces around and spaced from said group of electrodes, thereby creating along the surface of the earth an annular survey field spaced around said group, said field embracing the traces of said jointly induced equipotential surfaces; and making pick-up observations at spotted points in said field to obtain desired data; said spotted points being located substantially along the line passing through said two electrodes.

7. A method of geophysically exploring subsurface earth structures, which includes establishing a plurality of widely spaced electrodes and a source of current; connecting a group of two or more of said electrodes to one pole of said source, and one said electrode, lying without said group, to the other pole of said source to cause current flow and set up equipotential surfaces surrounding the electrodes of said group, thereby creating along the surface of the earth an annular survey field embracing the traces of said equipotential surfaces; and making pick-up observations in said field at spotted points to obtain desired data; said spotted points being located approximately along a median line of a region of relatively attenuated current intensity, and the one said electrode being located roughly along the general direction of said median line at a distance not in excess of three times the average distance of such electrodes individually from the group center, whereby a relatively greatly concentrated pick-up field is established along said line and said observations are caused to indicate conditions existing in a broadened remote area lying beyond said electrode group.

8. A method of geophysically exploring subsurface earth structures, which includes establishing three widely spaced and approximately alined electrodes and a source of current; connecting a pair of adjacent said electrodes to one pole of said source, and the third said electrode spaced from the first said pair to the other pole of said source to cause current flow and set up a group of jointly induced equipotential surfaces around said pair of electrodes, thereby creating along the surface of the earth a survey field annularly around said pair of electrodes, said field embracing the traces of said jointly induced equipotential surfaces; and making pickup observations at spotted points in said field to obtain desired data; said third electrode being spaced from the nearer electrode of said pair not in excess of the electrode spacing of said pair, whereby a relatively concentrated pick-up field is established between the unlike sign electrodes and said observations are caused to reflect conditions existing in a broadened remote area lying beyond said pair of electrodes.

9. A method of geophysically exploring subsurface earth structures, which includes establishing three widely spaced and approximately alined electrodes and a source of current; connecting a pair of adjacent said electrodes to one pole of said source, and the third said electrode spaced from the first said pair to the other pole of said source to cause current flow and set up a group of jointly induced equipotential surfaces around said pair of electrodes thereby creating along the surface of the earth a survey field annularly around said pair of electrodes, said field embracing the traces of said jointly induced equipotential surfaces; and making pick-up observations at spotted points in said field to obtain desired data; said third electrode being spaced from the nearer electrode of said pair approximately one-half the electrode spacing of said pair, whereby to greatly concentrate said pick-up field between the unlike sign electrodes and cause said observations to substantially reflect conditions existing in the remote area lying oppositely beyond said pair of electrodes.

10. A method of geophysically exploring subsurface earth structures, which includes establishing at least three electrodes individually widely spaced, and a source of current flow; connecting a group of at least two of said electrodes to one pole of said source, and one or more said electrodes, spaced from said group, to the other pole of said source to set up current flow, relatively adjusting the electrodes of said group to secure substantially equal current flow through each thereof, to thereby tend to induce sets of substantially equal equipotential surfaces each set individually around a said electrode, and an additional jointly induced set of equipotential surfaces around said individual sets of surfaces, thereby creating along the surface of the earth a zone lying in a belt around said group of electrodes and spaced therefrom, said zone embracing the traces of said jointly induced equipotential surfaces; and making pick-up observations, at spotted points in said belt zone to obtain desired data.

11. A method of geophysically exploring subsurface earth structures, which includes establishing at least three electrodes individually widely spaced, and a source of current flow; connecting a group of at least two or said electrodes, to one pole of said source, and one or more said electrodes, spaced from said group, to the other pole of said source to set up current flow, relatively adjusting the electrodes of said group to secure substantially equal current flow through each thereof, to thereby tend to induce sets of substantially equal equipotential surfaces each set individually around a said electrode, and an additional jointly induced set of equipotential surfaces around said individual sets of surfaces, thereby creating along the surface of the earth a zone lying in a belt around said group of electrodes and spaced therefrom, said zone embracing the traces of said jointly induced equipotential surfaces, maintaining a uniform flow of current from said source; and making pick-up observations, at spotted points in said belt zone to obtain desired data.

12. A method of geophysically exploring subsurface earth structures, which includes establishing at least three electrodes individually widely spaced and a source of current flow; connecting a group of at least two of said electrodes to one pole of said source, and one or more of said electrodes lying without said group to the other pole of said source to set up current flow, and induce sets of equipotential surfaces, each set around an individual electrode of said group, and to jointly induce around said individual sets of surfaces as a group an additional set of equipotential surfaces, thereby creating along the surface of the earth individual zones each around a said electrode and a zone lying as a belt around said individual zones collectively, said belt zone embracing the traces of said jointly induced equipotential surfaces; and making pick-up observations in said belt zone at spotted points to obtain desired data; said spotted points being located substantially along an axis of symmetry of said jointly induced surfaces, which axis passes through at least one said electrode.

13. A method of geophysically exploring subsurface earth structures, which includes establishing at least three electrodes individually widely spaced and a source of current flow; connecting a group of at least two of said electrodes to one pole of said source, and one or more of said electrodes lying without said group to the other pole of said source to set up current flow, and induce sets of equipotential surfaces, each set around an individual electrode of said group, and to jointly induce around said individual sets of surfaces as a group an additional set of equipotential surfaces, thereby creating along the surface of the earth individual zones each around a said electrode and a zone lying as a belt around said individual zones collectively, said belt zone embracing the traces of said jointly induced equipotential surfaces, maintaining uniform flow of current from said source; and making pick-up observations in said belt zone at spotted points to obtain desired data; said spotted points being located substantially along an axis of symmetry of said jointly induced surfaces, which axis passes through at least one said electrode.

14. A method of geophysically exploring subsurface earth structures, which includes establishing at least three electrodes individually widely spaced and a source of uniform current flow; connecting a group of at least two of said electrodes to one pole of said source, and one or more of said electrodes lying without said group to the other pole of said source to set up steady current flow, relatively adjusting the electrodes of said group to secure substantially equal current flow through each thereof and thereby tend to induce sets of substantially equal equipotential surfaces, each set individually surrounding a said electrode, and a jointly induced set of equipotential surfaces around said individual sets of surfaces as a group, thereby creating along the surface of the earth individual zones, respectively around said electrodes and an additional zone lying as a belt around said individual zones, said belt zone embracing the traces of said jointly induced equipotential surfaces; and making pick-up observations in said belt at spotted points to obtain desired data; said spotted points being located substantially along an axis of symmetry of said jointly induced field which axis passes through at least one said electrode.

15. A method of geophysically exploring subsurface earth structures, which includes establishing at least three electrodes individually widely spaced and a source of uniform current flow; connecting a group of at least two of said electrodes to one pole of said source, and one or more of said electrodes lying without said group to the other pole of said source to set up steady current flow, relatively adjusting the electrodes of said group to secure substantially equal current flow through each thereof and thereby tend to induce sets of substantially equal equipotential surfaces, each set individually surrounding a said electrode, and a jointly induced set of equipotential surfaces around said individual sets of surfaces as a group, thereby creating along the surface of the earth individual zones, respectively around said electrodes and an additional zone lying as a belt around said individual zones, said belt zone embracing the traces of said jointly induced equipotential surfaces, maintaining a uniform flow of current from said source; and making pick-up observations in said belt at spotted points to obtain desired data; said spotted points being located substantially along an axis of symmetry of said jointly induced field which axis passes through at least one said electrode.

16. In a method of geophysically exploring subsurface earth structures, establishing at least three electrodes and a source of current; connecting a group of adjacent said electrodes to one pole of said source, and at least one other said electrode spaced from said group to the other pole of said source to cause current flow and set up a group of jointly induced equipotential surfaces around said group, thereby creating along the surface of the earth a survey field annularly around said group of electrodes, said field embracing the traces of said jointly induced equipotential surfaces; and making pick-up in said field to obtain desired data; the nearest said other electrode being spaced from the nearest of said group electrodes not in excess of three times the average distance of said group electrodes individually from group center, whereby a relatively concentrated pick-up field is established between the unlike sign electrodes, and said pick-up is caused to reflect conditions existing under a broadened remote area lying beyond said group of electrodes.

17. In a method of geophysically exploring subsurface earth structures, establishing at least three electrodes and a source of current; connecting a group of adjacent said electrodes to one pole of said source, and at least one other said electrode spaced from said group to the other pole of said source to cause current flow and set up a group of jointly induced equipotential surfaces around said group, thereby creating along the surface of the earth a survey field annularly around said group of electrodes, said field embracing the traces of said jointly induced equipotential surfaces; approximately balancing currents through said adjacent electrodes of said group; and making pick-up by at least one search circuit in said field to obtain desired data; the nearest said other electrode being spaced from the nearest of said group electrodes not in excess of three times the average distance of said group electrodes individually from group center.

18. In a method of geophysically exploring subsurface earth structures, establishing at least three electrodes and a source of current, connecting a group of adjacent said electrodes to one pole of said source, and at least one other said electrode spaced from said group to the other pole of said source to cause current flow and set up a group of jointly induced equipotential surfaces around said group, thereby creating along the surface of the earth a survey field annularly around said group of electrodes, said field embracing the traces of said jointly induced equipotential surfaces; and making at least one pick-up observation in said field to obtain desired data; the nearest said other electrode being spaced from the nearest of said group electrodes not in excess of twenty times the average distance of said group electrodes individually from group center.

19. In a method of geophysically exploring subsurface earth structures, the establishing of at least three electrodes and a source of current flow; connecting a group of at least two said electrodes, the spacing between any two of which being at the least one-tenth of the greatest spacing between any two electrodes of the whole electrode configuration, to one pole of said source, and at least one said electrode spaced from said group, to the other pole of said source to set up current flow, and induce sets of equipotential surfaces individually around said electrodes of said group, and an additional set of equipotential surfaces around said individual sets of surfaces, thereby creating along the surface of the earth individual zones each around a said electrode, and a zone lying annularly as a belt around said individual zones collectively, said belt zone embracing the traces of said jointly induced equipotential surfaces; and making at least one pick-up reading to obtain desired data.

STEPHEN R. PHELAN.